United States Patent Office 3,444,202
Patented May 13, 1969

3,444,202
PRODUCTION OF N-[2,7,11(15)-ALKAPOLYENYL]AMINES
Harold Chung, Berkeley, Kenneth C. Dewhirst, San Pablo, and Edgar J. Smutny, San Francisco, Calif., assignors to Shell Oil Company, New York, N.Y., a corporation of Delaware
No Drawing. Filed May 12, 1966, Ser. No. 549,471
Int. Cl. C07c 87/24, 87/14, 87/20
U.S. Cl. 260—576                                    16 Claims

ABSTRACT OF THE DISCLOSURE

$C_{12}-C_{20}$ N-[2,7,11(15)-alkapolyenyl]derivatives of amines and their production by reacting a primary or secondary amine with $C_4-C_5$ 1,3-alkadiene and $C_8-C_{15}$ 1,3,7(11)-alkapolyene in the presence of a catalyst system comprising transition metal compounds as catalyst and phenoxide anion as catalyst promoter.

---

Methods are available in the art for the dimerization of conjugated dienes under conditions whereby a diene dimer or derivative thereof is produced. In general, such methods are characterized by the formation of a dimer or dimer moiety that results from dimerization in a non-linear manner, for example, dimerization of butadiene typically results in the formation of a methylheptatriene as the principal acyclic product type.

In the co-pending application of E. J. Smutny, U.S. Ser. No. 455,995, filed May 14, 1965, now U.S. Patent 3,350,451, issued Oct. 31, 1967, there is disclosed a process for the production of diene dimers wherein dimerization of a conjugated diene in the presence of a primary or secondary amine results in the formation of an amino derivative of a diene dimer wherein dimerization in a linear manner has taken place. According to the process disclosed therein, butadiene is dimerized in the presence of an amine, e.g., aniline, to produce an N-(2,7-octadienyl)amine, e.g., N-(2,7-octadienyl)aniline. The process is disclosed as only applicable to the dimerization of α,ω-conjugated dienes, however, and attempts to employ many terminally substituted butadiénes, e.g., piperylene and 1,3-octadiene, in similar dimerization processes are not successful. For example, it is not possible to dimerize piperylene in a manner similar to that disclosed by Smutny in order to produce an N-(methylnonadienyl) amine or an N-(decadienyl)amine as product. In like manner, piperylene is not successfully codimerized with butadiene, as utilization of minor proportions of butadiene and large excesses of piperylene in the process of U.S. Ser. No. 455,995 results in production of the butadiene dimer product in high selectivity with no observable formation of piperylene dimer derivative of a piperylene-butadiene co-dimer derivative. Additionally, 1,3-octadiene does not dimerize or co-dimerize with butadiene by the disclosed process.

It is an object of the present invention to provide a method for the production of N-[2,7,11(15)-alkapolyenyl]amines and the novel products thereby produced. An additional object is to provide a process for the co-dimerization of certain 1,3-alkadienes with certain terminally substituted butadienes of at least 8 carbon atoms.

It has now been found that these objects are accomplished by the process of contacting (a) an organic amine having at least one N-hydrogen substituent, (b) an acyclic alkadiene of 4 to 5 carbon atoms, namely butadiene, isoprene or piperylene, and (c) a $C_8-C_{10}$ 1,3,7-octatriene or alternatively a $C_{12}-C_{15}$ 1,3,7,11-dodecatetraene in the presence of a catalyst system comprising certain metal compound catalysts and a phenoxide catalyst promoter.

It has been found that the alkapolyene reactants of the invention, i.e., the $C_8-C_{10}$ 1,3,7-octatrienes and the $C_{12}-C_{15}$ 1,3,7,11-dodecatetraenes, are successfully co-dimerized with the 1,3-alkadiene reactant in contrast with the chemical behavior of other terminally-substituted butadienes, i.e., piperylene and 1,3-octadiene, which are not reactive in homodimerization processes.

Broadly speaking, the present invention contemplates the co-dimerization of a conjugated alkadiene of 4 to 5 carbon atoms and a mono-terminally substituted butadiene reactant of at least 8 carbon atoms having a carbon-carbon double bond which is γ,δ to the terminally-substituted butadiene moiety. The co-dimerization process is conducted in the presence of a primary or secondary amine and a catalyst system as will be discussed below and results in the formation of an amino derivative of the diene co-dimer.

The acyclic 1,3-alkadiene reactant of from 4 to 5 carbon atoms comprises a 1,3-butadiene moiety of from 0 to 1 methyl substituents as the sole substituents besides hydrogen. These reactants are butadiene, isoprene, and piperylene, of which, butadiene is the preferred reactant.

The other monomer employed in the co-dimerization process is a linear homo- or co-dimer of 1,3-butadiene and/or isoprene which is a 1,3,7(11)-alkapolyene of 8 to 15 carbon atoms having only internal methyl substituents on the 8 or 12 carbon chain and having two terminal methylene groups. Generically, the preferred reactants are represented by the formula

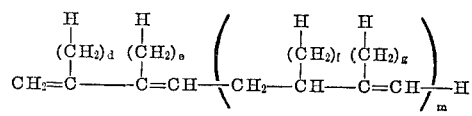

wherein $m$ is a whole number from 1 to 2 inclusive and $d$, $e$, $f$ and $g$ independently are whole numbers from 0 to 1 inclusive with the sum of $d$ and $e$ not exceeding 1 and the sum of $f$ and $g$ not exceeding 1.

The molar ratio of the $C_4-C_5$ 1,3-alkadiene reactant to the 1,3,7(11) alkapolyene reactant is not critical, but in order to obtain optimum yields of the co-dimer product, it is preferred that a molar amount of the $C_8-C_{15}$ 1,3,7(11)-alkapolyene reactant equal to or in excess over the molar amount of $C_4-C_5$ 1,3-alkadiene reactant is employed. Molar ratios of $C_8-C_{15}$ 1,3,7(11)-alkapolyene reactant to the $C_4-C_5$ 1,3-alkadiene reactant of from about 1:2 to about 10:1 are satisfactory, with ratios of from about 1:1 to about 5:1 being preferred.

In the process of the invention, the co-dimerization is effected in the presence of an organic amine having within the molecular structure thereof at least one amino moiety, i.e., a trivalent nitrogen atom wherein from 1 to 2 of the nitrogen substituent(s) is (are) hydrogen and the remaining nitrogen valences are bonded to substituent group(s) through a bond to a carbon atom. The process of the invention is broadly applicable to a wide variety of organic amines of complex or comparatively simple structure which have at least one N-mono- to N,N-di-hydro-nitrogen moiety within the molecular structure. Best results, however, are obtained when the organic amine reactant employed in the process is of comparatively simple structure. The organic amine reactant suitably is an organic amine of up to 20 carbon atoms and is a monoamino compound or is a polyamino compound of up to 4 amino-nitrogen atoms, preferably up to 2. Whether the structure of the organic amine reactant of the present invention incorporates a plurality of amino moieties or only one amino moiety, at least one amino nitrogen has one N-hydrogen substituent, that is, the amino moiety is a secondary amino moiety, or has two N-hydrogen substituents and is therefore a primary amino moiety. The presence of other amino-nitrogen groups which are tertiary amino groups and therefore contain no N-hydrogen substituents is not detrimental to the process of the invention, but at least one amino moiety present in the organic amine reactant, preferably each amino moiety present, is non-tertiary, i.e., is either primary or secondary amino having from 1 to 2 N-hydrogen substituents. The organic portion of the amine reactant is suitably wholly aliphatic in character or incorporates one or more aromatic moieties. Furthermore, the amine reactant is suitably a hydrocarbon amine having only atoms of carbon and hydrogen besides the amino nitrogen atom(s), or is a substituted-hydrocarbon amine containing atoms of oxygen and halogen, particularly up to 4 atoms of halogen of atomic number from 18 to 35 inclusive, i.e., the middle halogens chlorine and bromine, which atoms are incorporated within functional groups such as ether, keto, ester, and halo groups, provided that the amine reactant as a whole is devoid of acidic hydrogens, that is, the amine reactant contains no hydroxylic hydrogen atoms. The amine reactant is further characterized by the absence therefrom of acetylenic carbon-carbon unsaturation, so that the only carbon-carbon unsaturation present is ethylenic or aromatic, if any carbon-carbon unsaturation is present.

Illustrative aliphatic amine reactants include aliphatic hydrocarbon monoamines such as methylamine, ethylamine, allylamine, n-butylamine, isobutylamine, 3-aminomethylheptane, n-dodecylamine, dimethylamine, dipropylamine, diallylamine, piperidine, pyrrolidine, methylhexylamine, cyclohexylamine, cyclohexenylamine, N-ethylcyclohexylamine and N-octyldodecylamine; aliphatic hydrocarbon polyamines as exemplified by ethylenediamine, trimethylenediamine, 1,4-diaminohexane, diethylenetriamine, N,N-bis(2-aminoethyl)methylamine, 1,8-bis(4-aminobutylamino)octane and 1,4-bis(aminomethyl)cyclohexane and substituted hydrocarbon mono- and polyamines, e.g., 3-chloropropylamine, 2-methoxyethylamine, 2-propoxy-1,3-diaminopropane, N-methyl-4-acetoxybutylamine, bis(2-methylaminoethyl)ether, 1-amino-4,5-dibromohexane and the like.

The class of suitable amines which incorporate aromatic moieties within the reactant molecular structure includes hydrocarbon wholly aromatic amines, e.g., aniline, benzidine, p-phenylenediamine, pyrrole and α-naphthylamine; alkarylamines and aralkylamines such as benzylamine, o-toluidine, p-toluidine, xylylene diamine, β-phenylethylamine, N-methylaniline, 1,2,3,4-tetrahydroquinoline, 2-amino Tetralin, N-propylbenzylamine, N-butylaniline, N,N'-bis(ethylamino)benzene, 2,2-bis(4-aminophenyl) propane, 2,6-dimethyl aniline, N,N-bis(3-aminophenyl) methylamine and 3-phenylpyrrolidine; and at least partially-aromatic amines which are substituted hydrocarbon amines as illustrated by p-chloroaniline, β-aminopyridine, m-methoxyaniline, p-dimethylaminoaniline, N-(3-chloropropyl)benzylamine, phenoxymethylamine, 4,4'-diamino-2,2'-dibromobiphenyl, p-trichloromethylaniline, N-methyl-p-ethoxyaniline and 2,2-bis(4-amino-3-bromophenyl)propane.

In general, hydrocarbon and halohydrocarbon amines, generically designated (halo)hydrocarbon amines, are preferred over amine reactants having atoms other than the carbon, hydrogen, halogen, and the amino nitrogen atoms of the (halo)hydrocarbon amine reactants, and monoamines are preferred over analogous polyamino compounds. Particularly preferred are primary and secondary hydrocarbon monoamines wherein the hydrocarbon moiety is hydrocarbon of up to 12 carbon atoms and is free from non-aromatic unsaturation. The class of amines comprising aniline and N-lower alkyl derivatives thereof, i.e., N-(non- to mono-alkyl)aniline wherein any alkyl moiety is alkyl of up to 4 carbon atoms, provides a particularly desirable result.

The optimum ratio of amine reactant to total diene reactant will depend in part upon the functionality of the amine reactant, that is, the number of non-tertiary amino groups present in the amine reactant molecule, and the extent of conversion that is employed. Ratios of moles of total diene reactant to moles of non-tertiary amino group as low as about 1:10 are suitable if only a low conversion of the amine is employed. However, to obtain higher conversions, a more substantial proportion of diene is preferred and molar ratios of total diene reactant to non-tertiary amino group from about 1:1 to about 10:1 are more satisfactory. Best results are obtained when the molar ratio of diene to non-tertiary amino group is from about 2:1 to about 8:1. It should be understood that it is within the contemplated scope of the invention to react, on occasion, only a portion of the non-tertiary amino groups present in the amine reactant molecule. For example, in the case of a diamine, reaction takes place at both amine sites, or alternatively it is contemplated to effect reaction at only one amine group. The restrictive amine formation of the latter illustration is favored by molar reactant ratios comparatively high in the amine reactant.

The catalyst employed in the process of the invention is a metal compound wherein the metal is a VIII C metal having an atomic number from 46 to 78 inclusive, i.e., the metal is palladium and platinum. Most preferred as catalyst is a compound of palladium. Without wishing to be bound by any particular theory, it appears that the chemical transformations during the course of the reaction which involve the metal compound are quite complex, probably involving the formation and destruction of complexes between the metal moiety and the diene reactants and/or the presumed dimer intermediate. Metal complexes that are soluble in the reaction medium as well as compounds that are superficially insoluble in the reaction system are operable, apparently in the latter case through dissolved metal compound moieties, the formation of which is probably influenced by interaction with the diene reactant/or the amine reactant and the solubilization resulting therefrom. To obtain optimum reaction rates, the metallic compound is preferably soluble in the reaction mixtures or serves as a precursor of a soluble metal compound. It is apparent, however, that the metal-containing catalyst may be employed in any form which serves to introduce the metal compound into the reaction system.

In one modification of the invention, the metal-containing catalyst is introduced as a salt, and palladium or platinum salts of organic or inorganic acids which are strong or weak acids are suitable. When the metal-containing catalyst is provided as a salt, best results are obtained through utilization of a metal halide, e.g., platinum chloride, platinum bromide, palladium chloride, palladium iodide and the like, and particularly suitable results are obtained when metal chlorides are employed. Also suitable are salts wherein the metal is present in the anion, as for example in the case of palladium, the use of a chloropallidate salt is satisfactory, particularly an alkali metal pallidate, e.g., sodium chloropallidate.

In an alternate modification of the process, the catalyst is provided in the form of a metal complex. Employing palladium for purposes of illustration, one type of suitable complex is a complex of a palladium salt and organic ligand, such as is represented by the formula $$L_2PdX_2$$

wherein X is halogen, preferably chlorine, and L is a tertiary nitrogen-containing ligand complexed with the palladium through the nitrogen moiety thereof. Illustrative of such L groups are nitriles, both aromatic and aliphatic, such as benzonitrile, propionitrile, acetonitrile, toluonitrile and the like; heterocyclic tertiary nitrogen compounds such as pyridine, quinoline, isoquinoline, picoline and lutidine; and tertiary aliphatic amines such as triethylamine, tributylamine, and dimethylhexylamine.

An equally suitable type of palladium complex is a

π-allyl complex of palladium. The simplest member of this class is a π-allyl palladium salt which, when the anion is chlorine, is represented by the following formula.

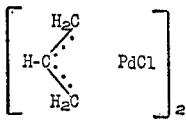

The preparation of this complex and related complexes is described by Huttel et al., Angew. Chemie, 71, 456(1959). Other illustrative π-allyl complexes are represented by the formula

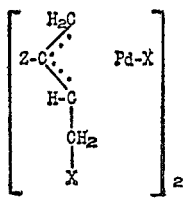

wherein X is halogen and Z is hydrogen or methyl, which complexes are conveniently prepared by reaction of a conjugated diene, e.g., butadiene or isoprene, with palladium halide in hydrocarbon media in the presence of other ligands, e.g., benzonitrile. Although alternate methods are available for calculating the oxidation state of the palladium present in such π-allyl complexes, it is herein considered that the palladium is palladium (II). It should be understood that analogous complexes of platinum are also suitable as catalysts in the process of the invention, although as previously stated, palladium-containing catalysts are generally to be preferred.

The process of the invention is characterized by the requirement for only catalytic quantities of platinum or palladium compound. Although utilization of larger amounts of metal-containing catalyst is not detrimental to the process of the invention, amounts larger than about 1% mole based on the amine reactant are not generally required. Amounts of metal compound less than about 0.001% mole on the same basis are generally unsuitable because of the inevitable physical losses of catalyst during reaction and processing. In most instances, amounts of catalyst from about 0.01% mole to about 0.5% mole based on the amine reactant are satisfactory and are preferred.

Although in certain applications the metal compound alone serves as an effective catalyst, the activity of the metal compound is greatly enhanced by the presence within the reaction mixture of a phenoxide anion catalyst promoter. By the term "phenoxide anion" as employed herein is meant the anion resulting, in effect, from removal of the hydrogen moiety of at least one phenolic hydroxyl group of a phenol, i.e., a compound having at least one hydroxyl group bonded to a carbon atom which is a member of an aromatic ring. The structure of the phenoxide anion is not critical and anions derived from phenols of up to 20 carbon atoms which are mononuclear or polynuclear and are phenols of from 1 to 4 phenolic hydroxyl groups are suitably employed. The phenoxide anion is monovalent, that is, a monoanion corresponding to the moiety obtained by removal of the hydrogen of one phenolic hydroxyl group, or is multivalent, i.e., a di-, tri- or quadra-anion illustratively obtained by removal of the hydrogen of more than one phenolic hydroxyl group of a phenol having a plurality of phenolic hydroxyl groups. Although phenoxide anions of relatively complex structure are suitably employed as catalyst promoter in the process of the invention, largely for reasons of convenience and economy it is preferable to employ a phenoxide anion of comparatively simple structure, for example, an anion of a mononuclear monohydric phenol which is a hydrocarbon phenol of from 6 to 10 carbon atoms containing only atoms of carbon and hydrogen besides the oxygen of the phenolic hydroxyl group, or is a halohydrocarbon phenol additionally having one or more, preferably from 1 to 2, atoms of halogen, particularly chlorine, within the molecule. These phenols are generically designated monohydric (halo)hydrocarbon phenols and the anions thereof as (halo)hydrocarbon phenoxide monoanions, and are illustrated, in the case of the phenols, by phenol, the cresols, p-chlorophenol, p-tert-butylphenol, the xylenols, 2,4-dichlorophenol, 3,5-diethylphenol and the like. Particularly preferred as the catalyst promoter in the process of the invention is the phenate anion, that is, the anion illustratively produced by removal of the acidic hydrogen of phenol.

The presence of phenoxide anion in the reaction system may be brought about by any convenient method. In one modification of the process of the invention, the phenoxide anion is prepared in situ by addition of a minor proportion of suitable phenol to the reaction mixture. Reaction of the phenol with a minor proportion of the amine reactant present results in formation of the phenoxide anion. Alternatively, other bases are added to react preferentially with the phenol because of the more basic character thereof, e.g., tertiary amines such as triethylamine, trimethylamine, pyridine and quinoline. In the preferred modification of the process of the invention, the phenoxide anion is added as a preformed material, e.g., as a soluble metal salt of a phenol. Suitable metal salts include alkali metal phenoxides, particularly sodium phenoxides.

The role of the phenoxide anion in the process of the invention is not completely understood. Without wishing to be bound by any particular theory, it appears probable that the phenoxide anion serves as a metal-bound ligand in metal-diene complexes which are possible intermediate species in the formation of the N-alkadienylamines of the invention. The phenoxide anion is desirably present in molar amounts that are equal to or greater than the molar amount of metal-containing catalyst compound. Molar ratios of phenoxide anion to metal compound from about 1:1 to about 8:1 are satisfactory, although molar ratios from about 1:1 to about 4:1 are preferred.

The process of the invention is typically conducted by charging the reactants, catalyst and catalyst promoter to an autoclave or similar reactor and maintaining the reaction mixture at reaction temperature until reaction is complete. The method of mixing is not critical although it is generally preferred to mix the reactants and add the catalyst and catalyst promoter thereto. The reaction is suitably conducted throughout a wide range of reaction temperatures and pressures, so long as the reactants are maintained substantially in the liquid phase. Reaction temperatures from about 0° C. to about 150° C. are satisfactory, although temperatures from about 20° C. to about 130° C. are preferred and best results are obtained when a temperature from about 80° C. to about 125° C. is employed. Typical reaction pressures vary from about 1 atmosphere to about 80 atmospheres. Frequently, good results are obtained when the reaction pressure is autogenous, that is, the pressure generated when the reactants are maintained at reaction temperature in a sealed reaction vessel. Such pressures are from about 1 atmosphere to about 20 atmospheres.

The process of the invention is conducted in the presence or in the absence of a solvent. In the modification wherein solvent is employed, solvents that are suitable are those capable of dissolving the reactants, catalyst and catalyst promoter, and are inert to the reactants and the products prepared therefrom. Exemplary solvents are ethers, including dialkyl ethers such as diethyl ether, dibutyl ether and methyl hexyl ether; alkyl aryl ethers such as anisole and phenyl butyl ether; cyclic ethers such as tetrahydrofuran, dioxane and dioxolane; and lower alkyl ethers (full) of polyhydric alcohols or polyoxyalkylene glycols such as ethylene glycol dimethyl ether, diethylene glycol dimethyl ether, tetraethylene glycol dimethyl ether and glycerol triethyl ether; aromatic hydrocarbons such as benzene, toluene and xylene; N,N-dialkyl alkanoic acid amides, e.g., dimethylformamide and N,N-diethylacetamide; halogenated hydrocarbons such as chloroform, carbon tetrachloride, tetrachloroethylene, methylene chloride and bromoform, sulfoxides such as dimethylsulfoxide, and nitriles such as acetonitrile and benzonitrile. The solvent, if any, is employed in molar excess over the amount of total reactants, and in general, moles of solvent up to about 150 moles per mole of total reactants are satisfactory. For convenience, it is generally preferred to conduct the reaction in the absence of added solvent whenever the physical characteristics of the reaction mixture, particularly the melting point, will allow.

Subsequent to reaction, the reaction mixture is separated and the desired product recovered by conventional means such as selective extraction, fractional distillation and chromatographic techniques.

The products of the invention are N-amino derivatives of one of two types. There is observed a certain proportion of N-alkadienyl amine product if butadiene or isoprene is employed as a reactant, which alkadienyl moiety is considered to be derived from the homodimer of the butadiene or isoprene. For example, in reactions involving butadiene and dimethylamide, a certain proportion of N-(2,7-octadienyl)dimethylamine is observed as product. Alternatively, from reaction of dimethylamine, isoprene and 1,3,7(11)-alkapolyene, a proportion of N-(dimethyl-2,7-octadienyl)dimethylamine is observed, principally the 3,7-dimethyl and the 3,6-dimethyl isomers. A principal component of the product mixture is the N-amino derivative of the diene codimer. In terms of the preferred reactants as above defined, the co-dimer products are derivatives of the amine reactant as above-defined wherein at least one N-hydrogen substituent of at least one amino moiety has been replaced with the alkapolyene moiety of the formula

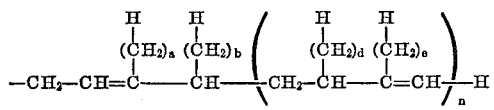

wherein $a$, $b$, $d$ and $e$ independently are whole numbers from 0 to 1 inclusive with the sum of $a$ and $b$ not exceeding 1 and the sum of $d$ and $e$ not exceeding 1, and $n$ is a whole number from 2 to 3 inclusive selected so that $n=m+1$ wherein $m$ has the previously stated significance. Although it is within the contemplated scope of the invention to effect reaction at each non-tertiary amino moiety, it is also within the contemplated scope to effect reaction at only a portion of the non-tertiary amino groups present, for example, to form an alkapolyenyl derivative at only one reactive site of an organic diamine. The process is adaptable for forming a mono-alkapolyenyl derivative of a primary amine as well as the bis-alkapolyenyl derivative wherein each N-hydrogen of the primary amino group has been replaced by the $C_{12}$–$C_{20}$ alkapolyenyl moiety depicted above.

It will be apparent that a wide variety of N-alkapolyenyl amines can be prepared by the process of the invention by varying the organic amine, the $C_4$–$C_5$ 1,3-alkadiene and the $C_8$–$C_{15}$ 1,3,7(11)-alkapolyene reactants. Illustrative of these products are N-(2,7,11-dodecatrienyl)aniline prepared from aniline, butadiene and 1,3,7-octatriene, N-(2,7,11,15-hexadecatetraenyl)aniline prepared from aniline, butadiene and 1,3,7,11-dodecatetraene, N-(3-methyl-2,7,11-dodecatrienyl) - N - methylaniline prepared from N-methylaniline, isoprene and 1,3,7-octadiene and N-(3,7,11 - trimethyl - 2,7,11 - dodecatrienyl)dimethylamine prepared from dimethylamine, isoprene, and 3,7-dimethyl-1,3,7-octatriene, as well as other illustrative products such as N-(3-methyl-2,7,11,15-hexadecatetraenyl)diethylamine, N,N'-bis(2,7,11-dodecatrienyl)trimethylenediamine, N,N-bis(2,7,11,15 - tetradecatetraenyl)allylamine, N-(10-methyl-2,7,11-dodecatrienyl)-α-naphthylamine, N-(4-methyl-2,7,11,15-hexadecatetraenyl) - 4 - aminohexylamine, N-(2,7,11,15-hexadecatetraenyl) - 3 - chloropropylamine, N,N-bis(2,7,11 - dodecatrienyl)benzylamine, N-(2,7,11-dodecatrienyl)-2,4-dichloroaniline and N-(2,7,11,15-hexadecatetraenyl)cyclohexylamine.

The products of the invention are useful in a variety of applications. The remaining unsaturated ethylenic linkages in the N-alkapolyenyl substituent are hydroxylated or hydrated to form alcohol derivatives from which esters or ethers are prepared. The amino moieties are oxidized to form amine-N-oxides which are useful as high-foaming detergents or are reacted with alkyl halides to form tertiary or quaternary ammonium salts which are useful as surface active agents and as germicides. The unsaturated linkages, particularly the terminal ethylenic linkage(s) serve as reactive sites in polymerization or co-polymerization with other unsaturates, e.g., ethylene, propylene and 1-butene, to form elastomers and thermoplastics and in addition the unsaturated linkages are epoxidized as by treatment with peracids to form corresponding epoxy derivatives from which epoxy resins are prepared by reaction with conventional curing agents, e.g., polybasic acid anhydrides.

To further illustrate the process of the invention and the novel products thereof, the following examples are provided. It should be understood that the details thereof are not to be regarded as limitations as they may be varied as will be understood by one skilled in this art.

EXAMPLE I

To a reactor was charged 1.4 g. of diethylamine, 4.0 g. of 1,3,7-octatriene, 2.6 g. of butadiene, 3 ml. of benzene, 0.134 g. of π-allyl palladium chloride and 0.17 g. of sodium phenate. The reaction mixture was maintained at 45° C. for 20 hours whereupon gas-liquid chromatographic analysis indicated a 75% conversion of the diethylamine with a 45% selectivity to N-(octadienyl)diethylamine and a 27% selectivity to N-(dodecatrienyl)diethylamine. A quantity of N-(2,7,11-dodecatrienyl)diethylamine was isolated by preparative gas-liquid chromatographic techniques and was found to have the following elemental analysis.

*Analysis.*—Calc., wt. percent: C, 81.7; H, 12.3. Found, wt. percent: C, 83.8; H, 12.9.

The mass spectrometric analysis of the product was consistent with the above structure.

EXAMPLE II

To a reactor was charged 4.0 g. of 1,3,7-octatriene, 2.6 g. of butadiene, 2.2 g. of N-methylaniline, 0.13 g. of π-allyl palladium chloride and 0.17 g. of sodium phenate. The reaction mixture was maintained at 45° C. for 20 hours and at 25° C. for 14 days whereupon gas-liquid chromatographic analysis indicated a 95% conversion of the N-methylaniline with a 20% selectivity to N-octadienyl)-N-methylaniline and an 80% selectivity to N-(dodecatrienyl)-N-methylaniline, of which 84% was the N-(2,7,11-dodecatrienyl)-N-methylaniline, B.P. 185–190° C. at 4 mm.

The mass spectrometric analysis and the infrared and nuclear magnetic resonance spectra of the product were consistent with the above structure.

EXAMPLE III

To a reactor was charged 5.4 g. of 1,3,7-octatriene, 3 ml. of benzene, 0.18 g. π-allyl palladium chloride, 0.24 g. of sodium phenate, 1.1 g. of dimethylamine and 2.7 g. of butadiene. The reaction mixture was maintained at 40° C. for 16 hours and then analyzed by gas-liquid chromatographic analysis which indicated a 90% conversion of the dimethylamine and a 10.4% selectivity to N-(dodecatrienyl)dimethylamine, of which 45% was the N-(2,7,11-dodecatrienyl)dimethylamine isomer. This isomer, B.P. 71° C. at 1 mm., $n_D^{20}$ 1.4652, had the following elemental analysis:

*Analysis.*—Calc., wt. percent: C, 81.2; H, 12.2. Found, wt. percent, C, 81.2; H, 12.1.

The infrared and nuclear magnetic resonance spectra were consistent with the proposed structure.

EXAMPLE IV

When diallylamine is reacted with 1,3,7-octatriene and butadiene according to the procedure of Example III in the presence of π-allyl palladium bromide and sodium phenate, a good yield of N-(dodecatrienyl)diallylamine is obtained. N-(2,7,11-dodecatrienyl)diallylamine is a liquid product having a refractive index, $n_D^{20}$, of 1.4813.

EXAMPLE V

When isoprene is employed in the procedure of Example II in place of the butadiene of that example, a good yield of N-(3-methyl-2,7,11-dodecatrienyl)-N-methylaniline is obtained.

EXAMPLE VI

When dipropylamine is reacted with butadiene and 1,3,7,11-dodecatetraene in toluene solution in the presence of bis(benzonitrile)palladium chloride, a good yield of N - (2,7,11,15 - hexadecatetraenyl)dipropylamine is obtained.

EXAMPLE VI

The procedure of Example II is repeated employing N-butylaniline as the amine, butadiene and 1,3,7,11-dodecatetraene as the diene and polyene reactants, respectively, and π-allyl platinum chloride as the catalyst. A good yield of N-(2,7,11,15-hexadecatetraenyl) - N - butylaniline is obtained.

EXAMPLE VIII

When a procedure similar to that of Example II is utilized to react butadiene, 1,3,7-octatriene and N,N'-dimethylethylenediamine in the presence of π-allyl palladium chloride and sodium phenate, a product mixture containing N-(2,7,11 - dodecatrienyl)-N,N'-dimethylethylenediamine and N,N'-bis(2,7,11 - dodecatrienyl)-N,N'-dimethylethylenediamine is obtained.

We claim as our invention:

1. The N-[2,7,11(15)-alkapolyenyl]amine wherein the amine moiety is that of an organic amine of up to 20 carbon atoms and from 1 to 4 amino moieties, at least one of said amino moieties of said organic amine being amino of from 1 to 2 hydrogen substituents, and at least one of the amino moieties of said N-[2,7,11(15)-alkapolyenyl]amine is substituted with the alkapolyene moiety of the formula

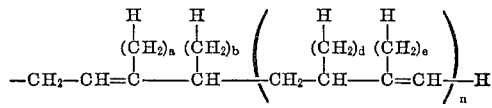

wherein $n$ is a whole number from 2 to 3 inclusive and $a$, $b$, $d$ and $e$ independently are whole numbers from 0 to 1 inclusive with the sum of $a$ and $b$ not exceeding 1 and the sum of $d$ and $e$ not exceeding 1.

2. The N-[2,7,11(15)-alkapolyenyl]amine of claim 1 wherein the amine is a (halo)hydrocarbon amine of up to 20 carbon atoms and from 1 to 2 amino moieties and halo is chloro or bromo, and each of $d$ and $e$ is 0.

3. The N-(2,7,11-alkapolyenyl)amine of claim 2 wherein $n$ is 2 and the amine is a hydrocarbon amine of up to 12 carbon atoms and is free from aromatic unsaturation, and each of $a$ and $b$ is 0.

4. The N-(2,7,11-alkapolyenyl)amine of claim 3 wherein the amine is dimethylamine.

5. The N-(2,7,11-alkapolyenyl)amine of claim 3 wherein the amine is N-methylaniline.

6. The N-(2,7,11,15-alkapolyenyl)amine of claim 2 wherein $n$ is 3 and the amine is a hydrocarbon amine of up to 12 carbon atoms and is free from non-aromatic unsaturation, and each of $a$ and $b$ is 0.

7. The N-(2,7,11,15-alkapolyenyl)amine of claim 6 wherein the amine is dipropylamine.

8. The process of producing N-(alkapolyenyl)amines by intimately contacting an organic amine having at least one N-hydrogen substituent with a $C_4$-$C_5$ 1,3-alkadiene reactant and a 1,3,7(11)-polyene reactant of the formula

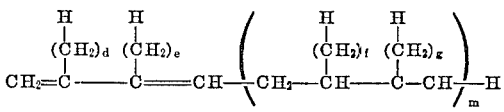

wherein $m$ is a whole number from 1 to 2 inclusive, $d$, $e$, $f$ and $g$ independently are whole numbers from 0 to 1 inclusive with the sum of $d$ and $e$ not exceeding 1 and the sum of $f$ and $g$ not exceeding 1, in the presence of a palladium or platinum compound as catalyst and a phenoxide anion catalyst promoter.

9. The process of claim 8 wherein the amine is an amine of up to 20 carbon atoms and from 1 to 4 amino moieties, at least one of which amino moieties has from 1 to 2 hydrogen substituents; the molar ratio of said 1,3-alkadiene to said 1,3,7(11)-polyene is from about 2:1 to about 1:10; the phenoxide anion is a phenoxide anion corresponding to that moiety produced by removal of at least one phenolic hydroxyl hydrogen from a phenol of up to 20 carbon atoms and from 1 to 4 phenolic hydroxyl groups; the catalyst is a π-allyl palladium halide and the molar ratio of said phenoxide anion to said palladium halide is from about 1:1 to about 8:1; and said intimate contacting is conducted at a temperature from about 20° C. to about 130° C. and a pressure from about 1 atmosphere to about 80 atmospheres.

10. The process of claim 9 wherein the amine is a (halo)hydrocarbon amine of up to 20 carbon atoms and from 1 to 2 amino moieties and halo is chloro or bromo, and the phenoxide anion is a monovalent, mononuclear (chloro)hydrocarbon phenoxide anion of from 6 to 10 carbon atoms and from 1 to 2 chlorine atoms.

11. The process of claim 10 wherein the phenoxide anion is the phenate anion and each of $d$, $e$, $f$ and $g$ is 0.

12. The process of claim 11 wherein the amine is a hydrocarbon monoamine wherein the hydrocarbon moiety is hydrocarbon of up to 12 carbon atoms and free from non-aromatic unsaturation, and $m$ is 1.

13. The process of claim 12 wherein the amine is dimethylamine.

14. The process of claim 12 wherein the amine is N-methylaniline.

15. The process of claim 11 wherein the amine is a hydrocarbon monoamine wherein the hydrocarbon moiety is hydrocarbon of up to 12 carbon atoms and free from non-aromatic unsaturation, and $m=2$.

16. The process of claim 15 wherein the amine is dimethylamine.

References Cited

UNITED STATES PATENTS 3,350,451   10/1967   Smutny _____ 260—576

CHARLES B. PARKER, *Primary Examiner.*

PATRICIA C. IVES, *Assistant Examiner.*

U.S. Cl. X.R.

260—288, 293, 313, 563, 570.8, 570.9, 583, 584